Patented July 23, 1946

2,404,453

UNITED STATES PATENT OFFICE 2,404,453

REMOVAL OF CHLORATE FROM CAUSTIC SODA

Sidney G. Osborne and Aloysius Mitchell, Niagara Falls, N. Y., assignors to Hooker Electrochemical Company, Niagara Falls, N. Y., a corporation of New York No Drawing. Application October 12, 1943, Serial No. 505,950

6 Claims. (Cl. 204—153)

Our invention relates more particularly to purification of solutions of caustic soda produced in electrolytic cells of the diaphragm type. Such solutions, as they come from the cells, generally contain about fifteen per cent of undecomposed sodium chloride and ten per cent of caustic soda. They also contain traces of iron and small quantities of sodium hypochlorite and sodium chlorate, produced in the cells by reaction of chlorine in solution in the electrolyte with the caustic soda as it is formed upon the surface of the cathode. These solutions are commonly concentrated in iron or nickel vacuum pans to fifty per cent caustic soda solution. This operation precipitates the undecomposed sodium chloride, which is removed. At the same time, the hypochlorite is broken down to chlorate and more iron may be picked up. The fifty per cent solution coming from the evaporators therefore commonly contains 1 to 10 parts of chlorate and 0.1 to 0.2 part of iron, per 1,000 parts of caustic soda, as well as a small quantity of residual sodium chloride.

Various processes have been developed for decreasing the iron content, such as those of Patents Nos. 2,023,271 and 2,109,250. These processes generally involve an oxidation, followed by a settling or filtration step, which may be aided by introduction of a finely divided salt or other material with which the oxidized iron forms an adsorption compound. Processes have also been developed for decreasing the quantity of residual sodium chloride, involving a crystallization step, as described in Patent No. 1,733,879.

Various processes have likewise been proposed for decreasing the chlorate content, by reducing it to the chloride. These involve introducing into the solution a reducing agent, such as cellulose, or a ferrous or cuprous salt. In the case of these metal salts, oxidation of the salt is promoted by passing externally generated current through the solution. This is accompanied by an increase in the iron contamination, and of course also in the sodium chloride content, which however can be ameliorated by the processes referred to above.

We have now discovered that reduction of the chlorate may be effected by simply contacting the solution with a metallic couple consisting of two metals well separated in the electromotive series and electrically connected to each other, so as to constitute with the solution a short-circuited primary battery. Under these circumstances one metal becomes anodic and the other cathodic and current passes between the two, without the necessity of impressing any externally generated voltage upon them.

These metals must of course be separately resistant to caustic alkalis. The cathodic metal should preferably be multivalent and amphoteric. Among the metals that are more or less suitable for our purpose as cathodes are those of the iron, cobalt, nickel group; among the metals that are more or less suitable for our purpose as anodes are copper, silver, platinum, gold, etc.

These metals may be used in the form of electrodes dipping into a body of the solution in a container. The wall of the container itself may serve as one electrode. The anodic metal may be in the form of an electroplated coating upon a base metal plate or upon the container wall. The short-circuiting connection between the electrodes may be outside the body of solution or submerged in it; or the metals of the couple may be simply in contact with each other within the body of solution. Thus it becomes possible to use the metals as a contact mass or bed consisting of a mixture of the metals in comminuted form.

During the reduction of the chlorate, the metal of the cathode is oxidized and slowly consumed, and of course becomes a contaminant, as in the processes of the above cited patents in which electrolysis by externally generated current is used. Also, as in the prior art processes, there is an increase in the sodium chloride content. However, as stated above, the solution normally contains iron, as well as sodium chloride, which must in any case be removed, and the introduction of a little more of these contaminants involves no new problem or additional step. In general, therefore, we prefer to use iron as the electronegative or cathodic metal. In some cases, however, where the solution has been concentrated in nickel evaporators and is therefore low in iron, we may use nickel. For the anodic metal we prefer in general to use copper.

In practice we may use the iron and copper in the form of lathe turnings. A contact mass or bed consisting of a mixture of such turnings is very permeable and presents a relatively great active surface. The solution is simply passed through the contact mass. As the iron is consumed, leaving the copper, the copper is withdrawn and mixed with more iron turnings for reuse.

If fifty per cent electrolytic caustic soda solution, containing sodium chlorate in amounts characteristic of such solutions, be passed through a contact mass of iron and copper turnings a very large part of the chlorate is reduced to sodium chloride and the pick up of iron does not exceed the amount that can be readily dealt with by recognized iron removal processes. At the same time, the bluish color characteristic of such solutions is destroyed.

The optimum rate of flow of the solution through a given contact mass depends upon its temperature, which should preferably not be below 80° C. The maximum temperature is of course fixed by the boiling point of the solution, which for 50 per cent caustic solution is about 156° C. The preferred temperature range is 130° to 145° C., at which temperatures the rate of flow of the solution is 500 to 1,000 lbs. per hour per cubic foot of contact mass.

*Example*

Caustic soda solution containing 50 per cent caustic soda, and 0.91 part of sodium chlorate per 1,000 parts of caustic soda by weight was passed through a bed of 32 cc. of mixed copper and iron turnings in about equal proportions at 135° to 140° C. and at the rate of 60 cc. of solution per minute, or 900 lbs. of solution per cubic foot of contact mass per hour. It was found that the solution after treatment in this way contained 0.040 part of sodium chlorate and 0.358 part of iron per 1,000 parts of caustic soda. The chlorate had therefore been decreased by 94.6 per cent.

The treated solution of the foregoing example was then subjected to an oxidation in known manner, settled and filtered, after which the iron content was found to be 0.099 part per 1,000 of caustic soda. The iron content could have been still further reduced by known methods, which form no part of our present invention.

According to present theory, in our process the solution of caustic soda first picks up iron to form sodium ferrite and this is oxidized by the chlorate to sodium ferrate. The further oxidation treatment then converts the sodium ferrate to a form at present unidentified, in which it readily settles out. However, we do not wish to be held to any particular theory as to our process, nor of course as to the further oxidation step of the prior art which causes the iron to settle out. Our process is very effective in removing sodium chlorate from the solution and the iron picked up, together with that originally present, may be removed by processes of the prior art, without any additional complication or expense.

If the solution to be purified should contain hypochlorite as well as chlorate, both will be reduced by our process.

We claim as our invention:

1. In the purification of substantially 50 per cent aqueous caustic soda solutions containing not over 10 parts of sodium chlorate per 1,000 parts of caustic soda, the method of effecting rapid electrolytic reduction of the chlorate which comprises contacting the solution with an electromotive couple composed of physically distinct metals and made up of a metal of the group consisting of iron, cobalt and nickel short-circuited with a metal of the group consisting of copper, silver, platinum and gold, at 130° to 156° C. and for a time effective in reducing a substantial proportion of the chlorate.

2. In the purification of substantially 50 per cent aqueous caustic soda solutions containing not over 10 parts of sodium chlorate per 1,000 parts of caustic soda, the method of effecting rapid electrolytic reduction of the chlorate which comprises contacting the solution with an electromotive couple composed of physically distinct metals and made up of a metal of the group consisting of iron, cobalt and nickel short-circuited beneath the surface of the solution with a metal of the group consisting of copper, silver, platinum and gold, at 130° to 156° C. and for a time effective in reducing a substantial proportion of the chlorate.

3. In the purification of substantially 50 per cent aqueous caustic soda solutions containing not over 10 parts of sodium chlorate per 1,000 parts of caustic soda, the method of effecting rapid electrolytic reduction of the chlorate which comprises passing the solution through a bed of comminuted metal of the group consisting of iron, cobalt and nickel supported by and in contact with a metal of the group consisting of copper, silver, platinum and gold, at 130° to 156° C. and at a rate effective in reducing a substantial proportion of the chlorate.

4. In the purification of substantially 50 per cent aqueous caustic soda solutions containing not over 10 parts of sodium chlorate per 1,000 parts of caustic soda, the method of effecting rapid electrolytic reduction of the chlorate which comprises passing the solution through a bed of comminuted metal of the group consisting of iron, cobalt and nickel supported by and in contact with an electrodeposit of a metal of the group consisting of copper, silver, platinum and gold, at 130° to 156° C. and at a rate effective in reducing a substantial proportion of the chlorate.

5. In the purification of substantially 50 per cent aqueous caustic soda solutions containing not over 10 parts of sodium chlorate per 1,000 parts of caustic soda, the method of effecting rapid electrolytic reduction of the chlorate which comprises contacting the solution with an electromotive couple composed of physically distinct metals and made up of iron and copper short-circuited together, at 130° to 156° C. and for a time effective in reducing a substantial proportion of the chlorate.

6. In the purification of substantially 50 per cent caustic soda solutions containing 1 to 10 parts of sodium chlorate per 1,000 parts of caustic soda, the method of effecting rapid electrolytic reduction of the chlorate which comprises passing the solution at 135° to 145° C. through a bed of mixed iron and copper turnings at the rate of 500 to 1,000 lbs. of solution per hour per cubic foot of said bed.

SIDNEY G. OSBORNE.
ALOYSIUS MITCHELL.